(12) United States Patent
Baek et al.

(10) Patent No.: US 7,123,464 B2
(45) Date of Patent: Oct. 17, 2006

(54) HIGH VOLTAGE INPUT APPARATUS FOR MAGNETRON

(75) Inventors: Seung Won Baek, Seoul (KR); Yong Soo Lee, Kyungki-do (KR); Jong Soo Lee, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/978,347

(22) Filed: Nov. 2, 2004

(65) Prior Publication Data

US 2005/0142946 A1    Jun. 30, 2005

(30) Foreign Application Priority Data

Dec. 30, 2003   (KR) ................ 10-2003-0100244

(51) Int. Cl.
*H01G 4/35* (2006.01)
(52) U.S. Cl. ............... 361/302; 361/303; 361/305; 361/320; 361/328; 333/182; 333/185
(58) Field of Classification Search ........ 361/302–305, 361/311, 314, 320, 328–330; 333/182, 185
See application file for complete search history.

(56) References Cited

U.S. PATENT DOCUMENTS

| 4,814,938 | A | 3/1989 | Arakawa et al. |
| 4,985,802 | A | 1/1991 | Ueno et al. |
| 5,544,002 | A | 8/1996 | Iwaya et al. |
| 5,600,531 | A * | 2/1997 | Jun ............................ 361/302 |
| 6,288,886 | B1 | 9/2001 | Sato et al. |
| 6,344,962 | B1 * | 2/2002 | Asada et al. ................ 361/302 |
| 2003/0147195 | A1 | 8/2003 | Hong |

FOREIGN PATENT DOCUMENTS

| EP | 0604652 | 7/1997 |
| EP | 1035554 | 9/2000 |
| EP | 1335394 | 8/2003 |
| JP | 2-224216 | 9/1990 |

OTHER PUBLICATIONS

English Language Abstract of JP 2-224216.
U.S. Appl. No. 10/978,485 to Yong Soo Lee et al.

* cited by examiner

*Primary Examiner*—Nguyen T. Ha
(74) *Attorney, Agent, or Firm*—Greenblum & Bernstein, P.L.C.

(57) ABSTRACT

A high pressure condenser for a magnetron, in which a pair of dielectric ceramics having an arch shape are separated from each other, central conductors are connected to internal peripheries of the dielectric ceramics, and a ground metal is connected to external peripheries of the dielectric ceramics, thereby not requiring any additional structure for connecting the dielectric ceramics and the central conductors, simplifying the structures of the central conductors, and reducing the quantity of the dielectric ceramics needed in proportion to the separation interval between the dielectric ceramics.

23 Claims, 14 Drawing Sheets

HIGH VOLTAGE INPUT APPARATUS FOR MAGNETRON

BACKGROUND OF THE INVENTION

1. Field of the Invention

The present invention relates to a high pressure condenser for a magnetron, and more particularly to a high pressure condenser for a magnetron, in which a dielectric ceramic is divided into a plurality of portions having an arch shape and electrodes are formed on the side surfaces of the plural portions of the dielectric ceramic.

2. Description of the Related Art

Generally, magnetrons are apparatuses for generating and outputting microwaves, installed in a microwave oven or etc., and include a high pressure condenser for inputting high voltage therethrough.

FIG. 1 is a cross-sectional view of a conventional magnetron. The conventional magnetron comprises an anode unit including vanes 12 and straps 13 forming a resonance circuit when anode voltage and anode current having constant quantities are applied to the magnetron, a cathode unit 14 placed inside the anode unit for generating a large quantity of thermal electrons and generating microwaves in a space where the cathode unit 14 acts with ends of the vanes 12, an antenna 15 for transmitting the microwaves generated in the acting space to the outside, a plurality of cooling pins 16 installed on the outer periphery of the anode unit for radiating heat converted from residual energy, which is not transformed into the microwaves, yokes 17 and 18 for protecting and supporting the anode unit and the cooling pins 16 and guiding external air to the cooling pins 16, upper and lower permanent magnets 19 and 20 respectively placed on lower and upper surfaces of the yokes 17 and 18 for constituting a closed magnetic circuit, and a filter box 22 including an LC filter 21 for removing high-frequency radiation noise.

The anode unit includes an anode main body 11 having a cylindrical shape, a plurality of the vanes 12 installed in the anode main body 11, and the straps 13 passing through the vanes 12 for constituting the resonance circuit between the vanes 12 and the straps 13.

The filter box 22 includes coils and ferrites for providing inductance to the LC filter 21, and a high pressure condenser 23 for inputting high voltage to the magnetron and providing capacitance to the LC filter 21 is installed on one side surface of the filter box 22.

FIG. 2 is a cross-sectional view of a conventional high pressure condenser for a magnetron, and FIG. 3 is an exploded perspective view of the conventional high pressure condenser.

As shown in FIGS. 2 and 3, the conventional high pressure condenser 23 comprises a dielectric ceramic 31, a ground metal 37, a lower cover 38, metal caps 39 and 40, central conductors 41 and 42, an upper cover 43, insulating tubes 44 and 45, and insulating fillers 46 and 47.

A pair of through holes 32 and 33 are formed through the dielectric ceramic 31, a pair of separation electrodes 34 and 35 are installed on the upper surface of the dielectric ceramic 31, and a common electrode 36 is installed on the lower surface of the dielectric ceramic 31.

A plurality of connection holes 37b for fixing the ground metal 37 to the filter box 22 are formed through four corners of a plate unit 37a having a rectangular shape of the ground metal 37. A protuberance 37d connected to the common electrode 36 is formed on the center of the plate unit 37a, and a through hole 37c having an oval shape is formed through the protuberance 37d of the plate unit 37a.

The metal caps 39 and 40 are bonded to the central conductors 41 and 42 and connected to the separation electrodes 34 and 35 so that the central conductors 41 and 42 and the separation electrodes 34 and 35 are connected.

Taps 41a and 42b are respectively formed integrally with the upper ends of the central conductors 41 and 42, and the central conductors 41 and 42 sequentially pass through the metal caps 39 and 40, the through holes 32 and 33 of the dielectric ceramic 31, and the oval through holes 37c of the ground metal 37, and are soldered to the metal caps 39 and 40.

The central conductors 41 and 42 are covered with the insulating tubes 44 and 45 made of a material having elasticity, such as silicon.

The insulating fillers 46 and 47 are closer to the central conductors 41 and 42 than to the dielectric ceramic 31. The insulating fillers 46 and 47 are exfoliated from the dielectric ceramic 31 due to residual stress of the insulating fillers 46 and 47 or stress generated by the variation in temperature, thereby depreciating withstand voltage. The insulating tubes 44 and 45 made of an elastic material, which coat the central conductors 41 and 42, prevent the above depreciation of the withstand voltage.

The lower cover 38 is attached to the ground metal 37, thereby surrounding the lower parts of the central conductors 41 and 42 coated with the insulating tubes 44 and 45.

The upper cover 43 is attached to the ground metal 37, thereby surrounding the dielectric ceramic 31, the metal caps 39 and 40, and the upper parts of the central conductors 41 and 42.

The high pressure condenser 23 is installed such that the inside of the high pressure condenser 23 is vertically divided by the ground metal 37, the dielectric ceramic 31 and the metal caps 39 and 40. The insulating fillers 46 and 47 are respectively injected into the high pressure condenser 23 through an opening of the upper cover 43 and an opening of the lower cover 38.

The insulating filler 46, which is injected into the high pressure condenser 23 through the opening of the upper cover 43, surrounds the outer surfaces of the dielectric ceramic 31 and the metal caps 39 and 40 and the upper parts of the central conductors 41 and 42, and the insulating filler 47, which is injected into the high pressure condenser 23 through the opening of the lower cover 38, fills the insides of the dielectric ceramic 31 and the metal caps 39 and 40 and surrounds the insulating tubes 44 and 45.

Since the inside of the high pressure condenser 23 is vertically divided so that the insulating fillers 46 and 47 are injected into the high pressure condenser 23 by two steps, and is hardened, the conventional high pressure condenser 23 is disadvantageous in that time and costs taken to fill the high pressure condenser 23 with the insulating fillers 46 and 47 are increased, a step for soldering the metal caps 39 and 40 for connecting the central conductors 41 and 42 and the separation electrodes 34 and 35 is required, the central conductors 41 and 42 have complicated structures due to the attachment between the central conductors 41 and 42 and the metal caps 39 and 40, and the dielectric ceramic 31 and the insulating fillers 46 and 47 are interposed between the central conductors 41 and 42.

SUMMARY OF THE INVENTION

Therefore, the present invention has been made in view of the above problems, and it is an object of the present invention to provide a high pressure condenser for a magnetron, in which a dielectric ceramic is divided into a plurality of portions having an arch shape and electrodes are formed on the side surfaces of the plural portions of the dielectric ceramic, thereby having a simple structure, simplifying an assembly process, and reducing production costs.

In accordance with one aspect of the present invention, the above and other objects can be accomplished by the provision of a high pressure condenser for a magnetron, comprising: dielectric ceramics having an arch shape; internal electrodes respectively disposed along internal peripheries of the dielectric ceramics; central conductors respectively connected to the internal electrodes; external electrodes respectively disposed along external peripheries of the dielectric ceramics; a ground metal contacting the external electrodes; and an insulating filler surrounding the dielectric ceramics and the central conductors.

In accordance with another aspect of the present invention, there is provided a high pressure condenser for a magnetron, comprising: a pair of dielectric ceramics having an arch shape, and respectively including external electrodes disposed along external peripheries thereof and internal electrodes disposed along internal peripheries thereof; a pair of central conductors respectively connected to the internal electrodes; a ground metal including a tub unit contacting the external electrodes; an insulating case surrounding the dielectric ceramics and the tub unit; an insulating base inserted into the tub unit, and including a pair of through holes for passing the central conductors and a hollow protrusion disposed between a pair of the dielectric ceramics; and an insulating filler injected into the insulating case and hardened.

In accordance with yet another aspect of the present invention, there is provided a high pressure condenser for a magnetron, comprising: a pair of dielectric ceramics having an arch shape, and respectively including external electrodes disposed along external peripheries thereof and internal electrodes disposed along internal peripheries thereof; a pair of central conductors respectively connected to the internal electrodes; a ground metal including a tub unit contacting the external electrodes; an insulating case surrounding the dielectric ceramics and the tub unit; an insulating base inserted into the tub unit, and including a pair of through holes for passing the central conductors; an insulating filler injected into the insulating case and hardened; and an electromagnetic wave interruption gasket installed on the ground metal, and including a pair of second through holes for respectively passing the central conductors.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 1:
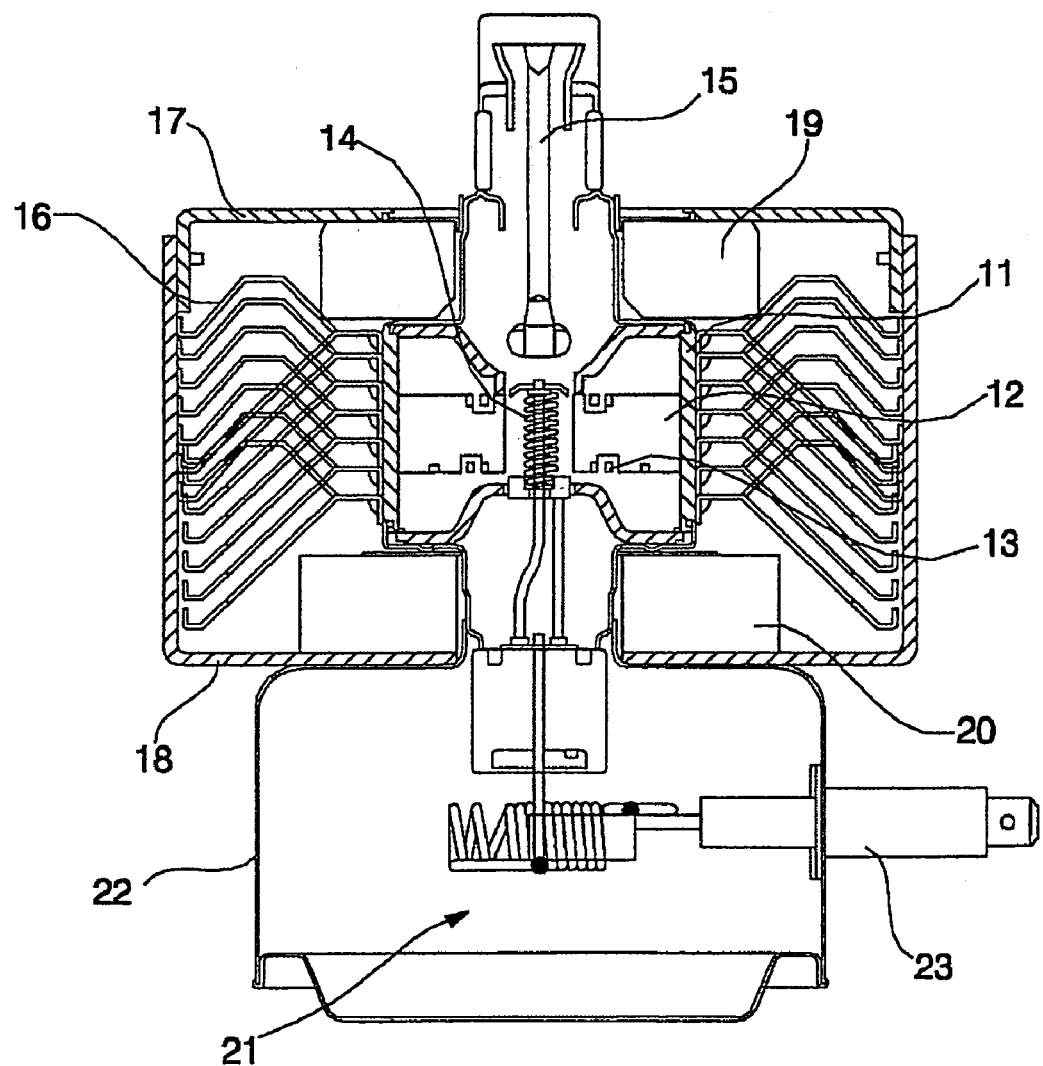
FIG. 1 is a cross-sectional view of a conventional magnetron.
Figure 2:
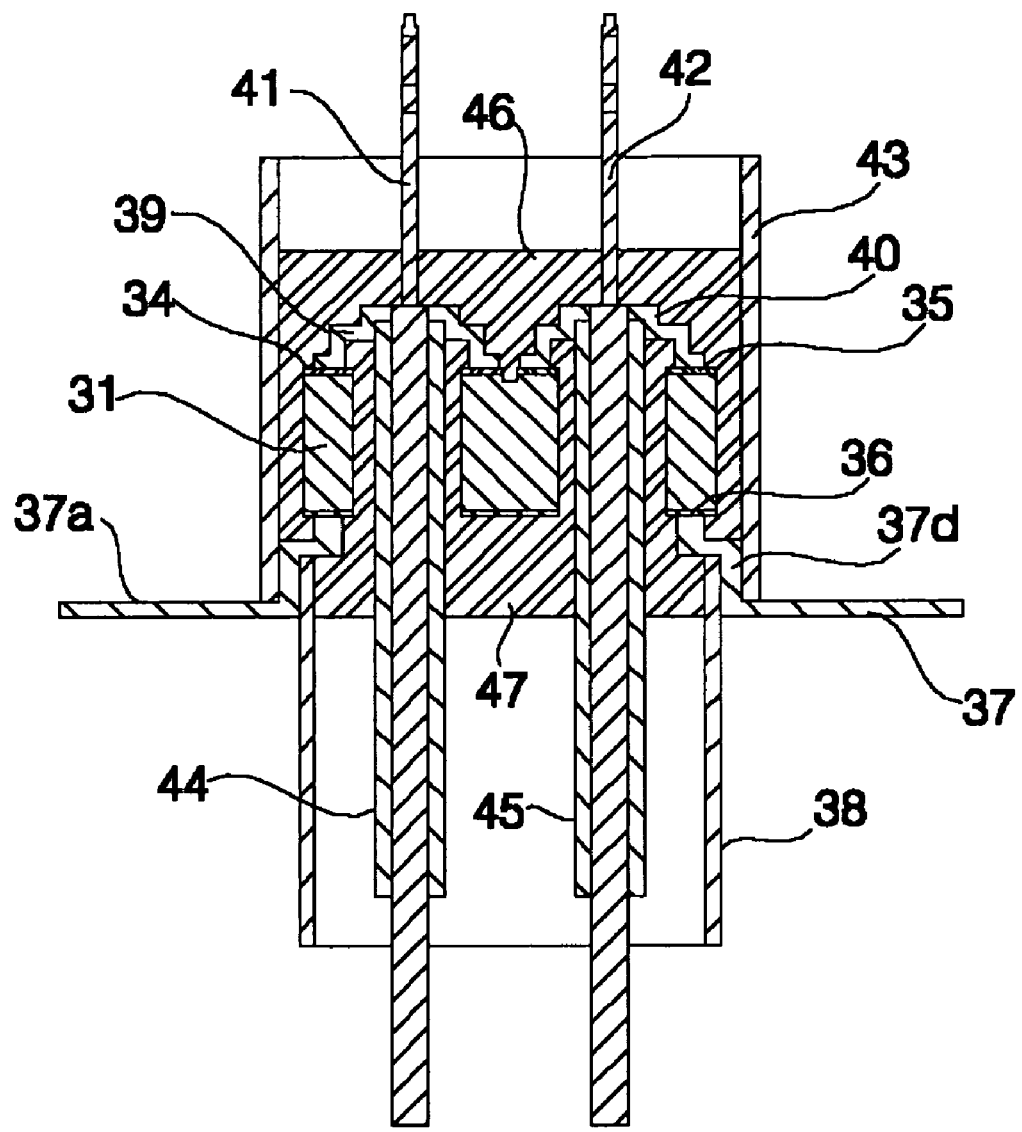
FIG. 2 is a cross-sectional view of a high pressure condenser for the conventional magnetron.
Figure 3:
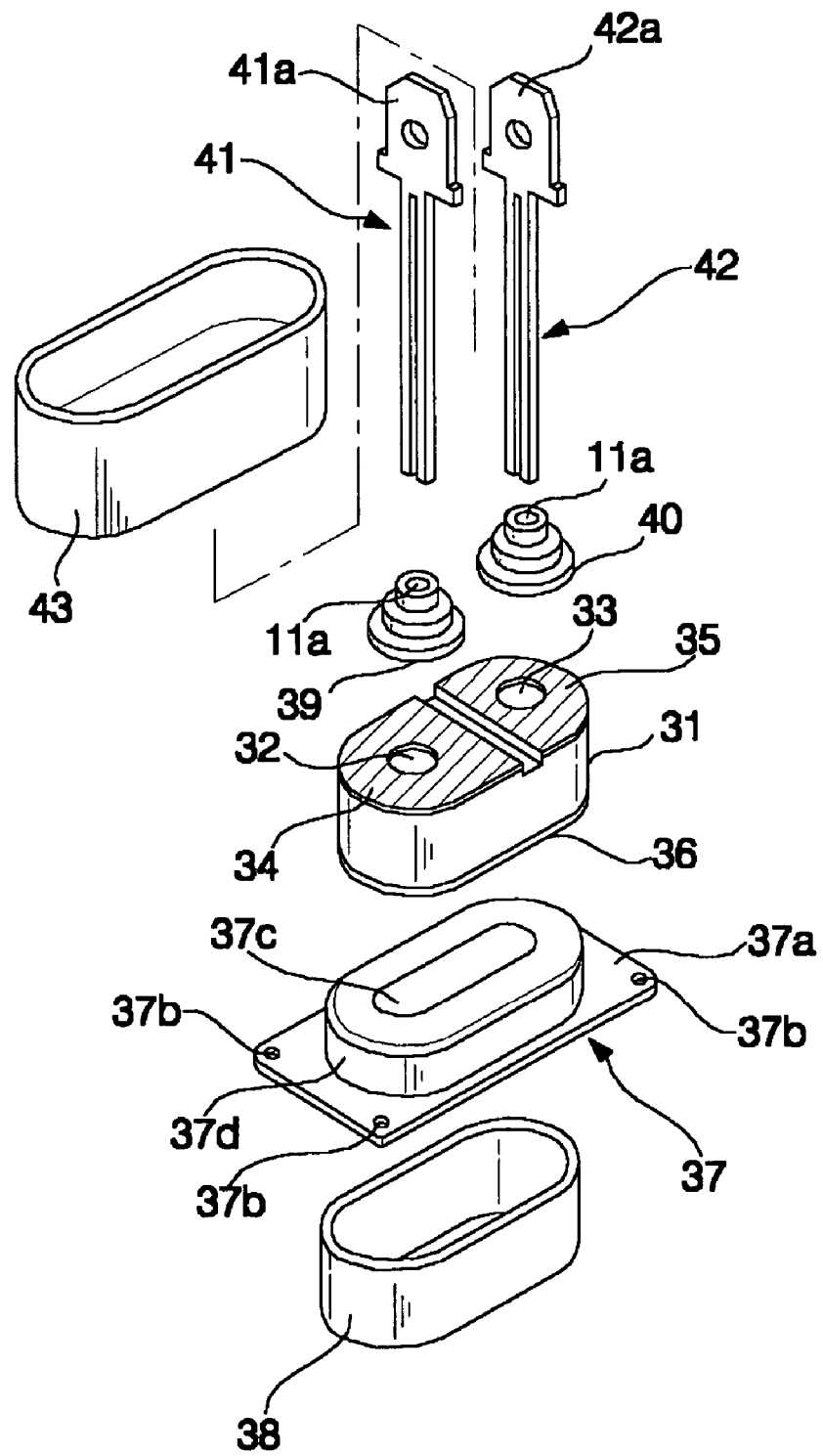
FIG. 3 is an exploded perspective view of the high pressure condenser for the conventional magnetron.
Figure 4:
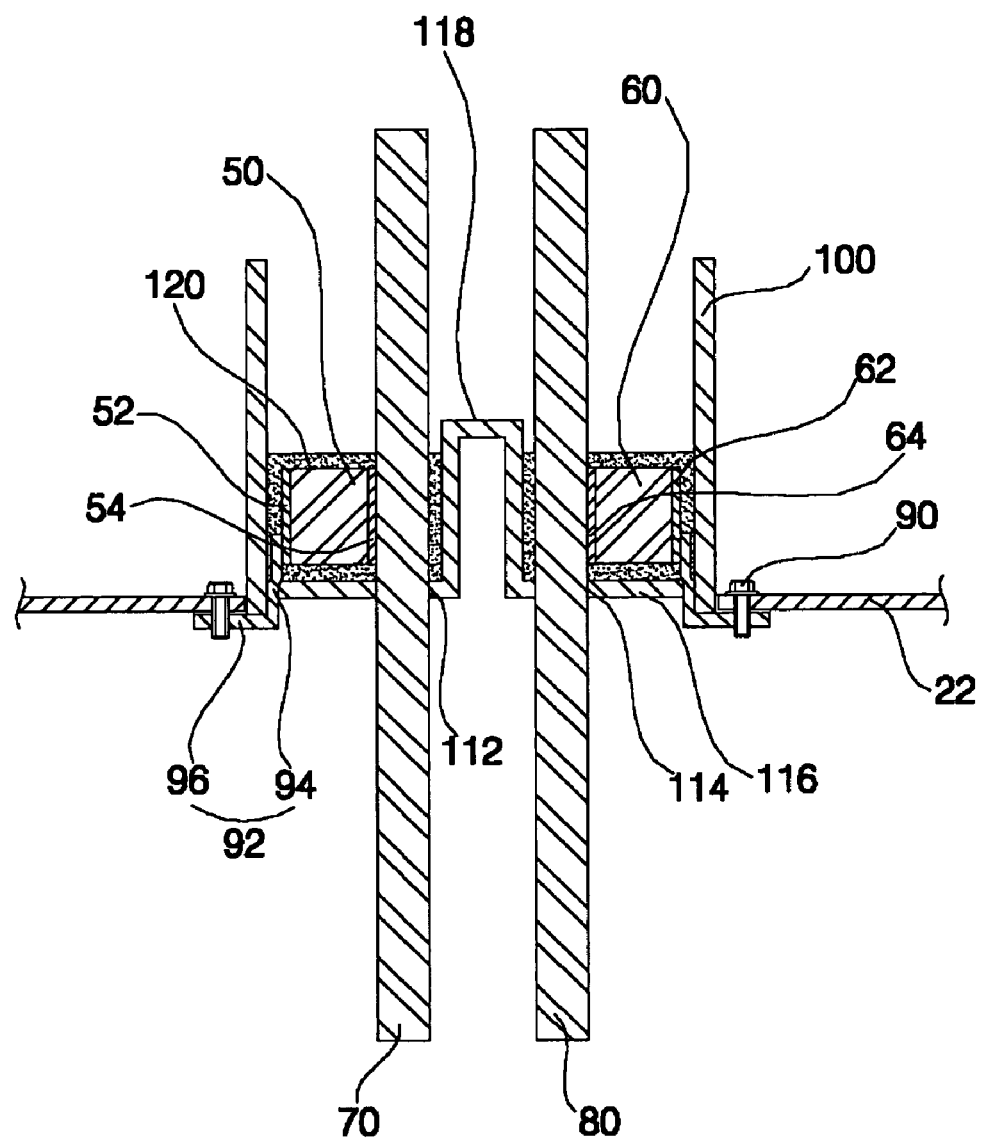
FIG. 4 is a longitudinal-sectional view of a high pressure condenser for a magnetron in accordance with a first embodiment of the present invention.
Figure 5:
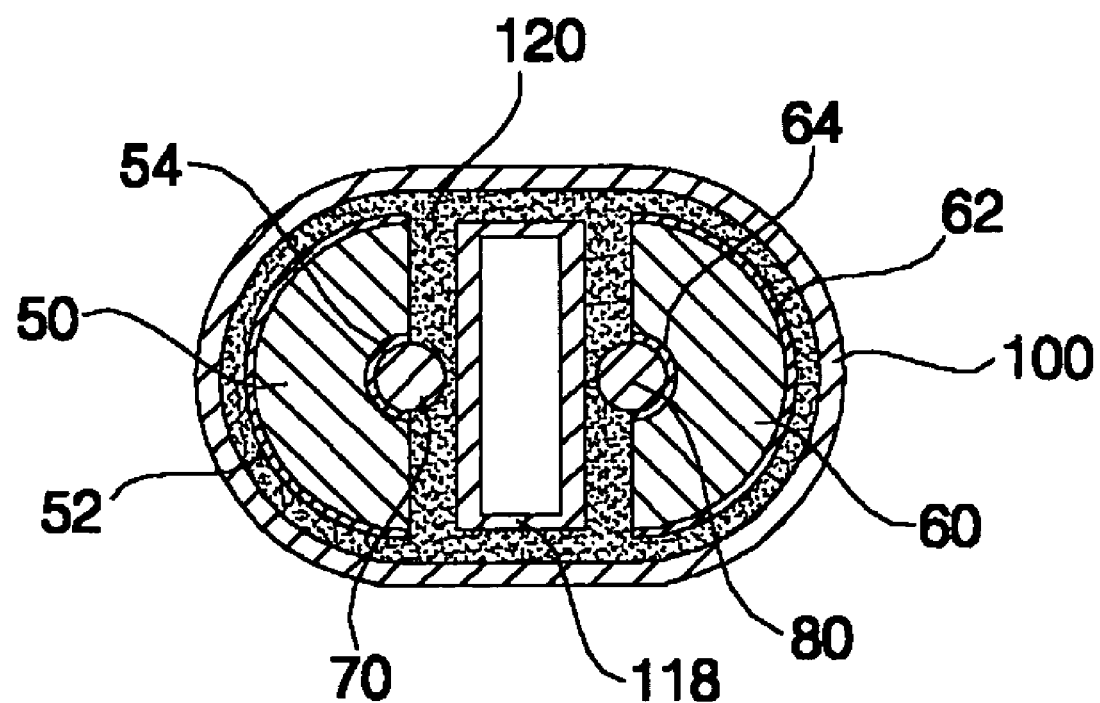
FIG. 5 is a cross-sectional view of the high pressure condenser in accordance with the first embodiment of the present invention.
Figure 6:
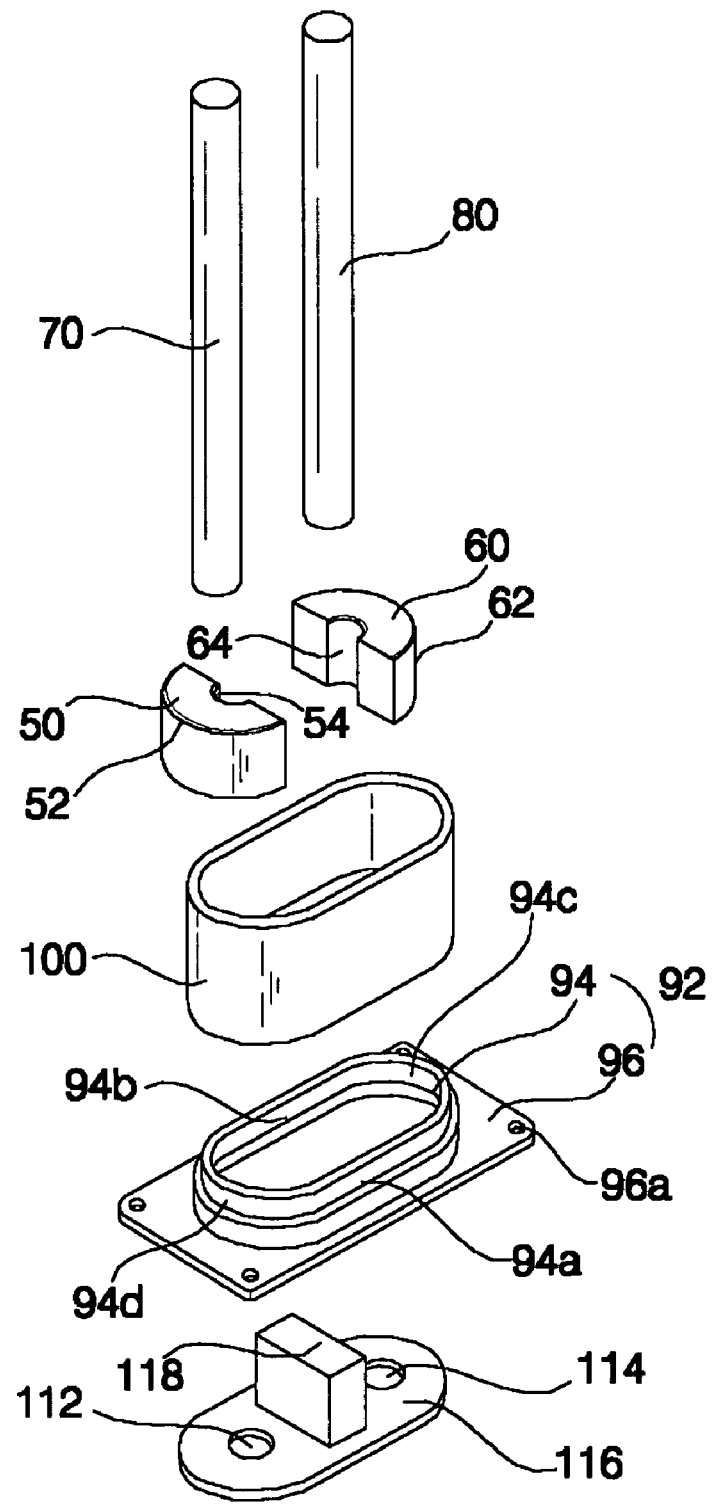
FIG. 6 is an exploded perspective view of the high pressure condenser in accordance with the first embodiment of the present invention.

FIG. 4 is a longitudinal-sectional view of a high pressure condenser for a magnetron in accordance with a first embodiment of the present invention. FIG. 5 is a cross-sectional view of the high pressure condenser in accordance with the first embodiment of the present invention. FIG. 6 is an exploded perspective view of the high pressure condenser in accordance with the first embodiment of the present invention.

As shown in FIGS. 4 to 6, the high pressure condenser in accordance with the first embodiment comprises two dielectric ceramics 50 and 60 having an arch shape, external electrodes 52 and 62 respectively disposed along the outer peripheries of the dielectric ceramics 50 and 60, and internal electrodes 54 and 64 respectively disposed along the inner peripheries of the dielectric ceramics 50 and 60.

The external electrodes 52 and 62 and the internal electrodes 54 and 64 have an arch shape with a small thickness.

A pair of the dielectric ceramics 50 and 60 are separated from each other such that the dielectric ceramics 50 and 60 are opposite to the internal electrodes 54 and 64.

The above high pressure condenser further comprises a pair of central conductors 70 and 80 respectively connected to the internal electrodes 54 and 64.

The central conductors 70 and 80 contact the internal electrodes 54 and 64 by 180° of the whole peripheries thereof, and are welded to the internal electrodes 54 and 64.

Here, since the central conductors 70 and 80 does not contact the whole peripheries (360°) of the internal electrodes 54 and 64, but rather contact the portions (180°) of the peripheries of the internal electrodes 54 and 64, stress between the central conductors 70 and 80 and the dielectric ceramics 50 and 60 is not generated when the high pressure condenser is turned on/off, the dielectric ceramics 50 and 60 are not exfoliated from an insulating filler 120, which will be described later, and an additional insulating tube for preventing the above exfoliation is not required.

The high pressure condenser further comprises a ground metal 92 connected to a filter box 22 of the magnetron by locking bolts 90.

The ground metal 92 includes a tub unit 94 contacting the external electrodes 52 and 62, and a plate unit 96 protruded from the tub unit 94 outwardly.

The tub unit 94 includes first and second rectilinear portions 94a and 94b, which are separated from each other so that they are opposite to each other, and first and second curved portions 94c and 94d, which have an arch shape equal to the shape of the dielectric ceramics 50 and 52, and is longitudinally hollowed.

The tub unit 94 is welded to the external electrodes 52 and 62.

The plate unit 96 is protruded from the end of the tub unit 94 outwardly, and connection holes 96a, into which the locking bolts 90 are respectively inserted, are formed through four corners of the plate unit 96.

The high pressure condenser further comprises an insulating case 100 surrounding the dielectric ceramics 50 and 52 and the tub unit 94.

The insulating case 100 has the same shape as that of the tub unit 94, so that the tub unit 94 is inserted into the insulating case 100, and a length larger than that of the tub unit 94, and is longitudinally hollowed.

The high pressure condenser further comprises an insulating base 116, which is inserted into the tub unit 94 and has a pair of through holes 112 and 114 for passing a pair of the central conductors 70 and 80.

The insulating base 116 serves to close one opening of each of the insulating case 100 and the tub unit 94, and the external edge of the insulating base 116 has the same shape as that of the internal periphery of the tub unit 94.

A hollow protrusion 118 is formed on the central portion of the insulating base 116 such that the protrusion 118 is located between the dielectric ceramics 50 and 60 and between the central conductors 70 and 80.

The hollow protrusion 118 has a rectangular parallelepiped structure having a hollow therein and one opened surface.

The insulating filler 120 together with the tub unit 94 and the insulating base 116 surrounds the dielectric ceramics 50 and 60 and parts of the central conductors 70 and 80 so as to have a sufficient withstand voltage, and is made of synthetic resin, such as epoxy resin.

The insulating filler 120 is injected into the insulating case 100 through the other opening of the insulating case 100, is obstructed by the tub unit 94 and the insulating base 116, and is then hardened.

Hereinafter, an assembling process of the above-described high pressure condenser will be described in detail.

First, after the internal electrodes 54 and 64 of the dielectric ceramics 50 and 60 respectively contact the central conductors 70 and 80, the internal electrodes 54 and 64 are welded to the central conductors 70 and 80. Then, after the external electrodes 52 and 62 of the dielectric ceramics 50 and 60 respectively contact the inner periphery of the tub unit 94 of the ground metal 92, the external electrodes 52 and 62 are welded to the tub unit 94 of the ground metal 92.

Here, the dielectric ceramics 50 and 60 are separated from each other by a designated interval, thereby reducing the costs for a material needed in proportion to the above interval.

Thereafter, when the tub unit 94 of the ground metal 92 is inserted into the insulating case 100 such that the tub unit 94 of the ground metal 92 contacts the inner surface of the insulating case 100, parts of the central conductors 70 and 80, the dielectric ceramics 50 and 60, and the tub unit 94 of the ground metal 92 are surrounded by the insulating case 100.

The protrusion 118 of the insulating base 116 is inserted into the tub unit 94 of the ground metal 92 such that the protrusion 118 of the insulating base 116 is located between the dielectric ceramics 50 and 60. Then, openings of the tub unit 94 of the ground metal 92 and the insulating case 100 are closed by the insulating base 116, and the insides of the tub unit 94 of the ground metal 92 and the insulating case 100 are respectively divided into two spaces, i.e., left and right spaces, by the protrusion 118.

Thereafter, the insulating filler 120 in a liquid state is injected into the insulating case 100 through the other opening of the insulating case 100. The injected liquid insulating filler 120 fills a space between the insulating case 100 and the external electrodes 52 and 62, and a space among the central conductors 70 and 80, the dielectric ceramics 50 and 60 and the protrusion 118. Here, the injected liquid insulating filler 120 cannot fill the central portion of the insulating case 100, on which the protrusion 118 is formed.

That is, it is possible to reduce the quantity of the insulating filler 120 needed in proportion to the dimensions a space occupied by the protrusion 118.

After a designated time had passed, the liquid insulating filler 120 injected into the insulating case 100 is hardened, and surrounds the tub unit 94 of the ground metal 92, the insulating base 116, parts of the central conductors 70 and 80, and the dielectric ceramics 50 and 60.

Finally, the ground metal 92 is fixed to the filter box 22 by the locking bolts 90. Thereby, the assembly of the high pressure condenser of the present invention is completed.

When the magnetron is operated, the dielectric ceramics 50 and 60 of the above-assembled high pressure condenser for the magnetron have a designated capacitance due to the phase difference between the external electrodes 52 and 62 and the internal electrodes 54 and 64, and filters out noise having passed through the high pressure condenser.

Figure 7:
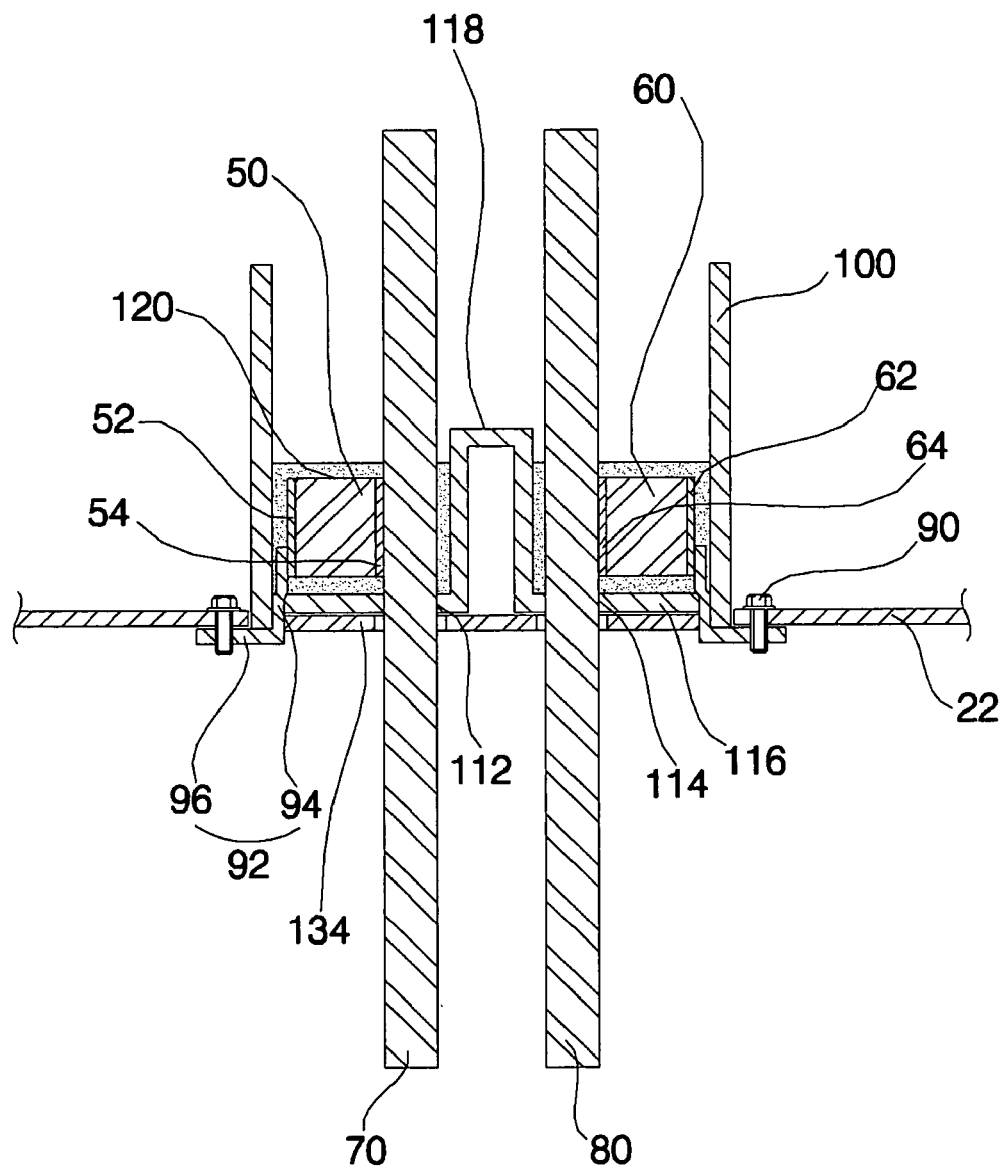
FIG. 7 is a cross-sectional view of a high pressure condenser for a magnetron in accordance with a second embodiment of the present invention.
Figure 8:
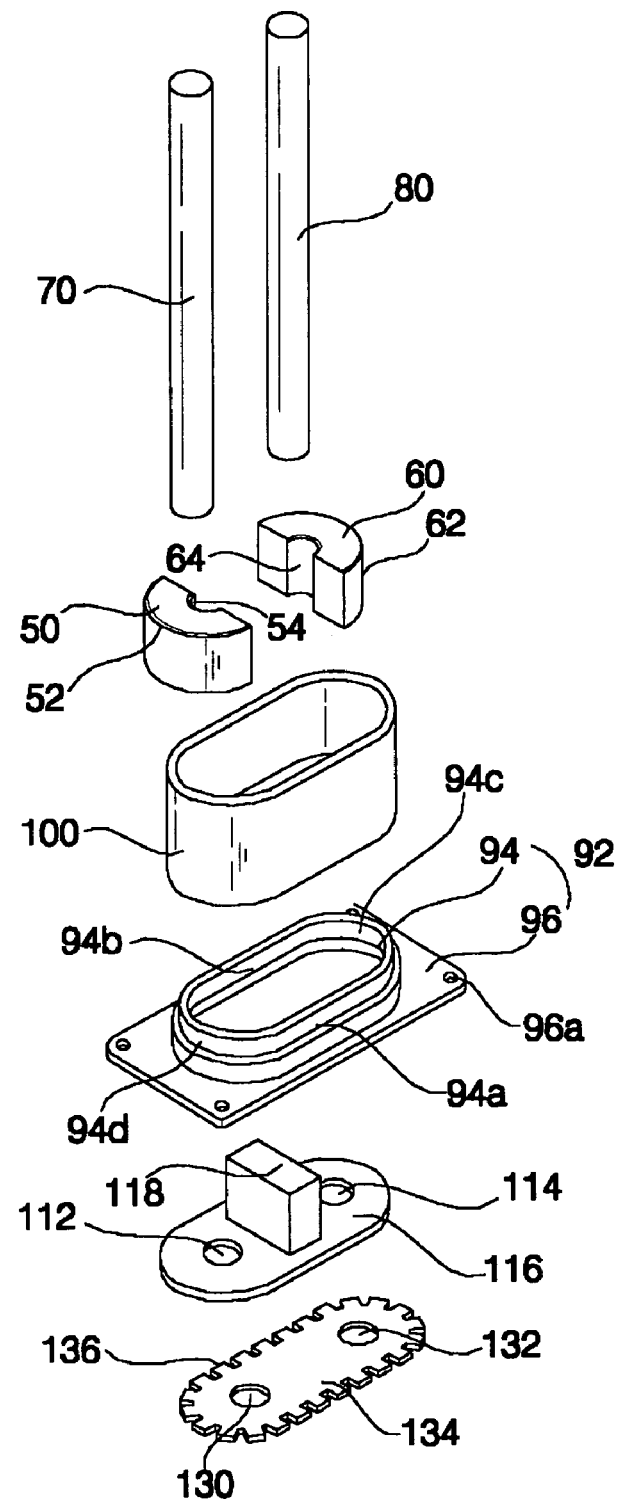
FIG. 8 is an exploded perspective view of the high pressure condenser in accordance with the second embodiment of the present invention.

FIG. 7 is a cross-sectional view of a high pressure condenser for a magnetron in accordance with a second embodiment of the present invention. FIG. 8 is an exploded perspective view of the high pressure condenser in accordance with the second embodiment of the present invention.

As shown in FIGS. 7 and 8, the high pressure condenser in accordance with the second embodiment comprises a pair of the dielectric ceramics 50 and 60, a pair of the central conductors 70 and 80, the ground metal 92, the insulating case 100, the insulating base 116, and the insulating filler 120, which are substantially the same as the high pressure condenser in accordance with the first embodiment, and further comprises an electromagnetic wave interruption gasket 134, having second through holes 130 and 132 for passing the central conductors 70 and 80, installed on the ground metal 92. Other parts of the high pressure condenser in accordance with the second embodiment except for the electromagnetic wave interruption gasket 134 are substantially the same as those of the high pressure condenser in accordance with the first embodiment and are denoted by the same reference numerals even though they are depicted in different drawings, and a detailed description thereof will thus be omitted because it is considered to be unnecessary.

The electromagnetic wave interruption gasket 134 is made of a metal thin film, and has an external periphery having the same shape as that of the tub unit 94 and teeth 136 formed along the external periphery thereof such that the electromagnetic wave interruption gasket 134 is inserted into the tub unit 94 of the ground metal 92 by press fit.

Since high frequency waves are interrupted by the electromagnetic wave interruption gasket 134 and the dielectric ceramics 50 and 60 have a designated capacitance when the magnetron is operated, the high pressure condenser in accordance with this embodiment filters out noise passing through the high pressure condenser.

Figure 9:
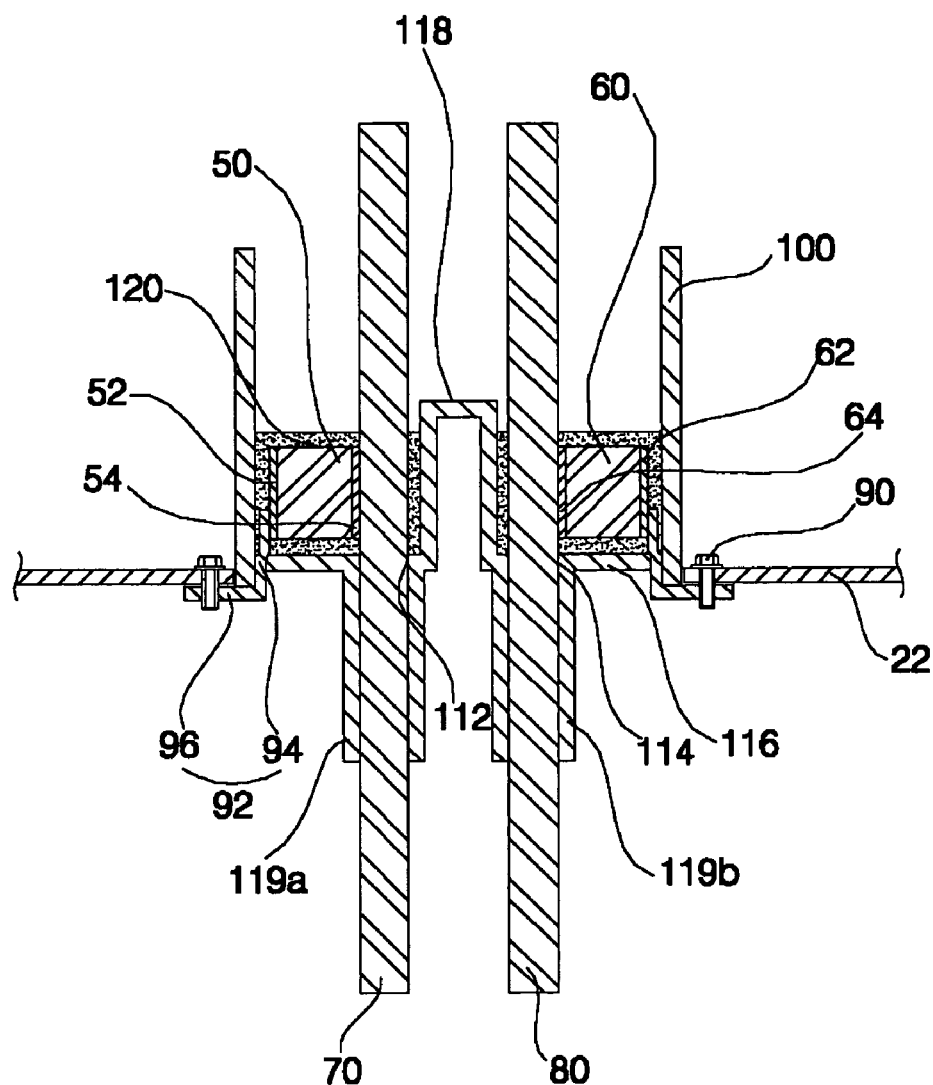
FIG. 9 is a cross-sectional view of a high pressure condenser for a magnetron in accordance with a third embodiment of the present invention.

FIG. 9 is a cross-sectional view of a high pressure condenser for a magnetron in accordance with a third embodiment of the present invention.

As shown in FIG. 9, the high pressure condenser in accordance with the third embodiment further comprises a pair of pipes 119a and 119b protruded integrally from the insulating base 116 respectively for passing the central conductors 70 and 80. Other parts of the high pressure condenser in accordance with the third embodiment except for a pair of the pipes 119a and 119b are substantially the same as those of the high pressure condenser in accordance with the first or second embodiment and are denoted by the same reference numerals even though they are depicted in different drawings, and a detailed description thereof will thus be omitted because it is considered to be unnecessary.

The pipes 119a and 119b are connected to the through holes 112 and 114 of the insulating base 116 so that the pipes 119a and 119b surround the central conductors 70 and 80, and are integrally protruded from the insulating base 116 in the direction opposite to the protrusion 118.

Since the pipes 119a and 119b surround parts of the central conductors 70 and 80, the high pressure condenser in accordance with the third embodiment ensures an insulating distance.

Figure 10:
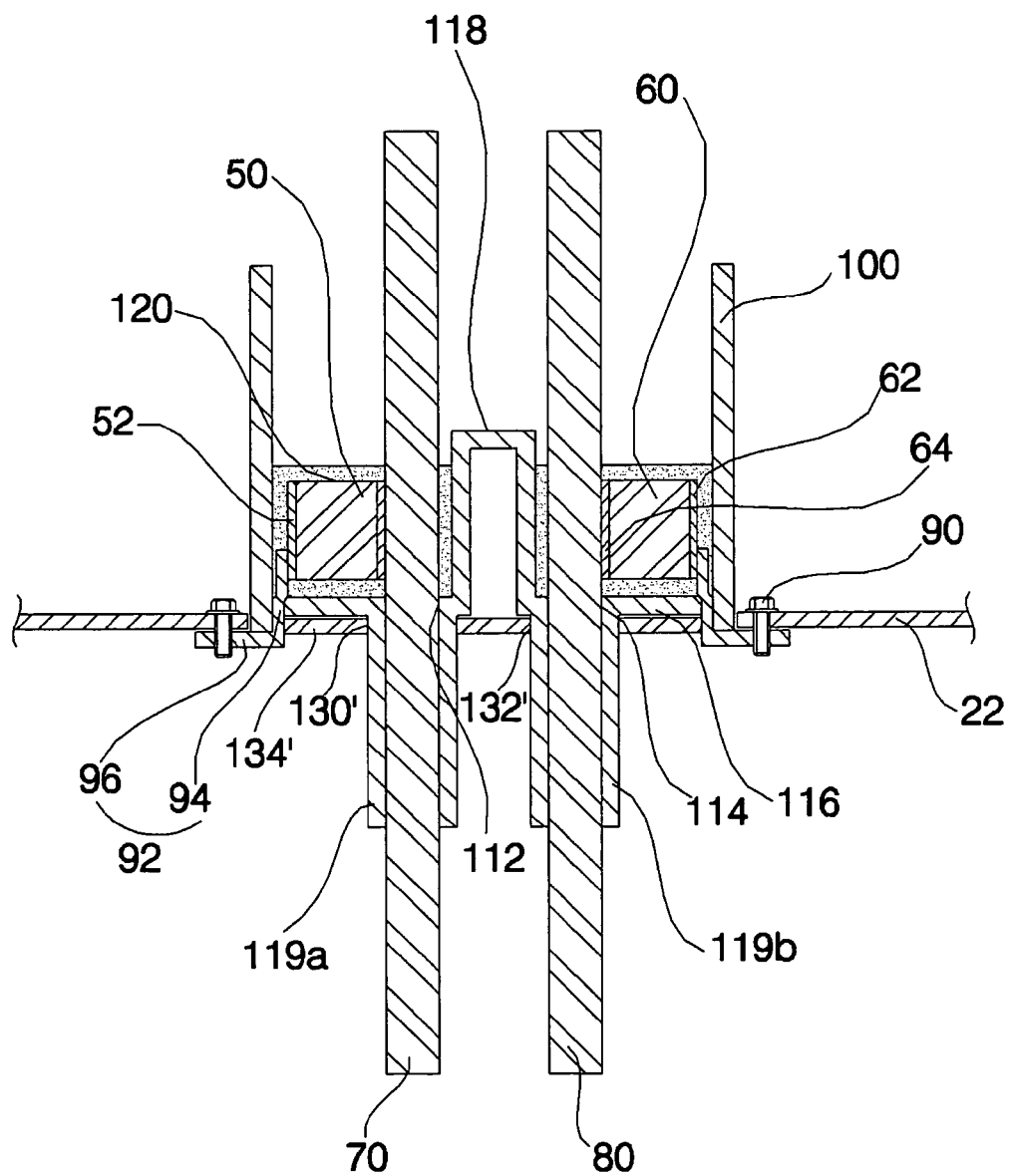
FIG. 10 is a cross-sectional view of a high pressure condenser for a magnetron in accordance with a fourth embodiment of the present invention.

FIG. 10 is a cross-sectional view of a high pressure condenser for a magnetron in accordance with a fourth embodiment of the present invention.

As shown in FIG. 10, the high pressure condenser in accordance with the fourth embodiment further comprises a pair of the pipes 119a and 119b, protruded integrally from the insulating base 116 respectively for passing the central conductors 70 and 80, and an electromagnetic wave interruption gasket 134', having a pair of second through holes 130' and 132' for passing the central conductors 70 and 80 and the pipes 119a and 119b, installed on the ground metal 92. Other parts of the high pressure condenser in accordance with the fourth embodiment except for a pair of the pipes 119a and 119b and the electromagnetic wave interruption gasket 134' are substantially the same as those of the high pressure condenser in accordance with the first or second embodiment and are denoted by the same reference numerals even though they are depicted in different drawings, and a detailed description thereof will thus be omitted because it is considered to be unnecessary.

Since a pair of the pipes 119a and 119b surround parts of the central conductors 70 and 80, the high pressure condenser in accordance with the fourth embodiment ensures an insulating distance, and high frequency waves are interrupted by the electromagnetic wave interruption gasket 134' when the magnetron is operated.

Figure 11:
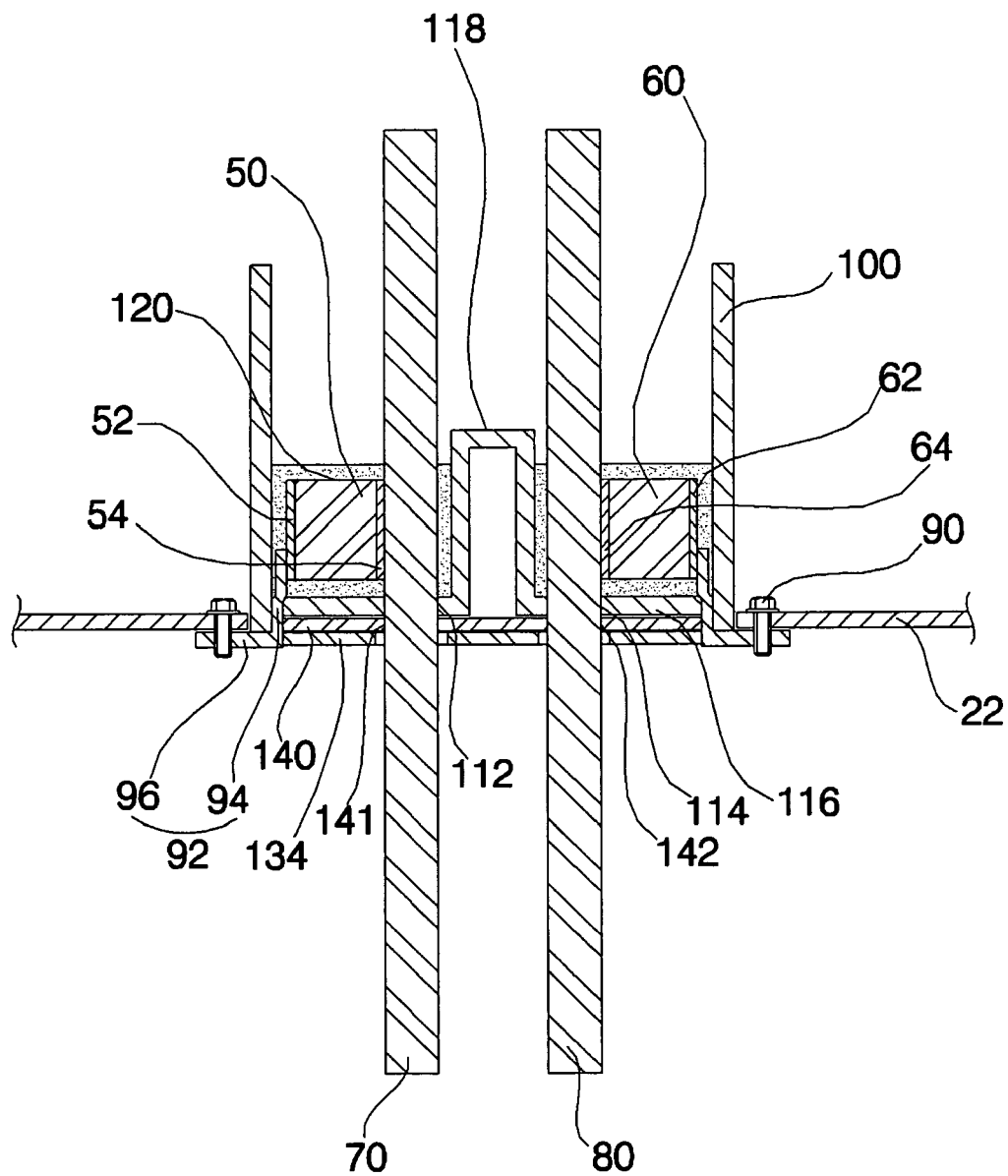
FIG. 11 is a cross-sectional view of a high pressure condenser for a magnetron in accordance with a fifth embodiment of the present invention.

FIG. 11 is a cross-sectional view of a high pressure condenser for a magnetron in accordance with a fifth embodiment of the present invention.

As shown in FIG. 11, the high pressure condenser in accordance with the fifth embodiment further comprises a high frequency absorber 140 installed on the ground metal 92 for passing a pair of the central conductors 70 and 80. Other parts of the high pressure condenser in accordance with the fifth embodiment except for the high frequency absorber 140 are substantially the same as those of the high pressure condenser in accordance with any one of the first to fourth embodiments and are denoted by the same reference numerals even though they are depicted in different drawings, and a detailed description thereof will thus be omitted because it is considered to be unnecessary.

The high frequency absorber 140 is made of ferrite, and a pair of through holes 141 and 142 for passing the central conductors 70 and 80 are formed through the high frequency absorber 140.

The external periphery of the high frequency absorber 140 has the same shape as that of the internal periphery of the tub unit 94 so that the high frequency absorber 140 is inserted into the tub unit 94 of the ground metal 92.

Since the high frequency absorber 140 absorbs high frequency waves and the dielectric ceramics 50 and 60 have a designated capacitance when the magnetron is operated, the high pressure condenser in accordance with the fifth embodiment filters out noise passing through the high frequency condenser.

Figure 12:
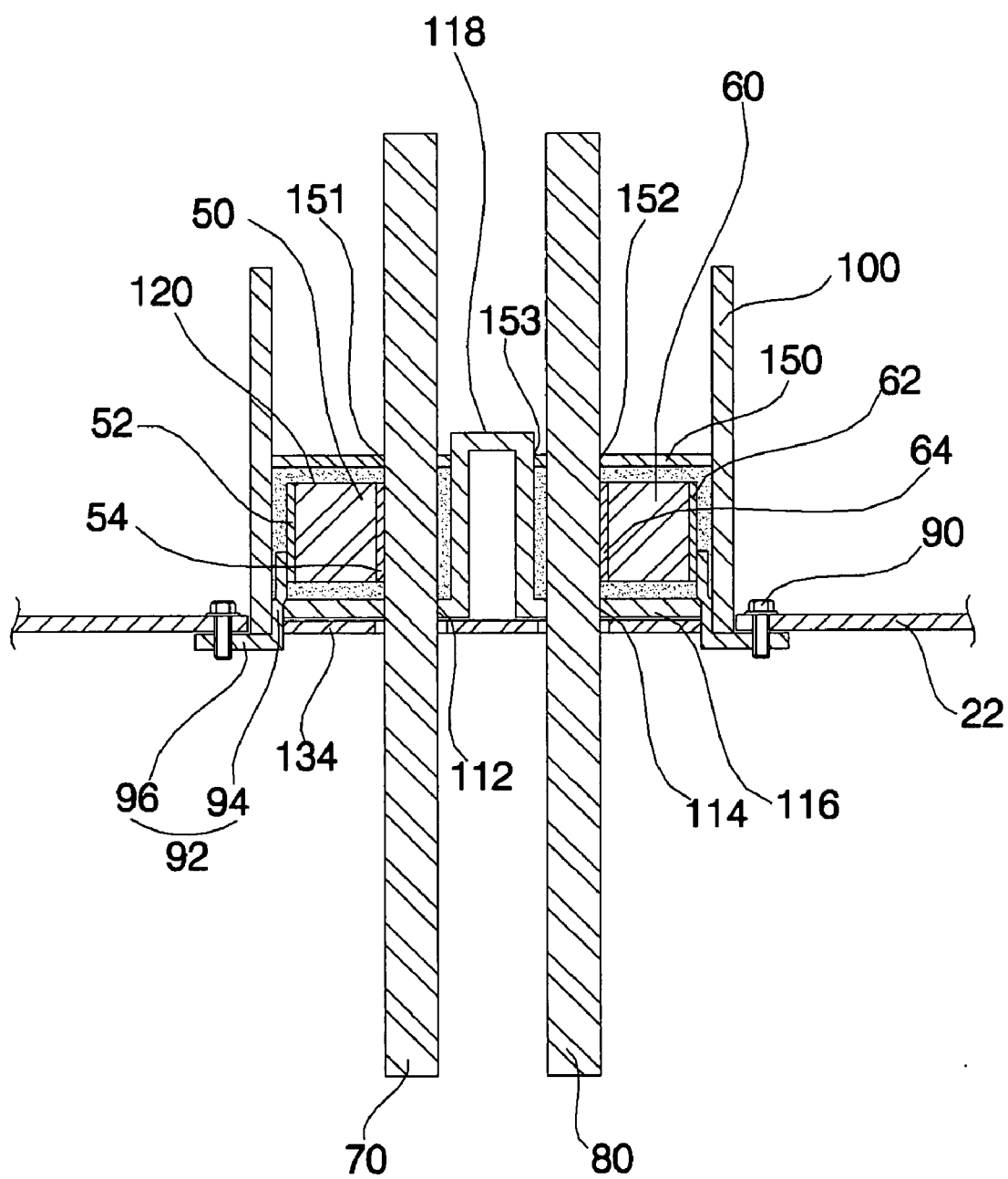
FIG. 12 is a cross-sectional view of a high pressure condenser for a magnetron in accordance with a sixth embodiment of the present invention.

FIG. 12 is a cross-sectional view of a high pressure condenser for a magnetron in accordance with a sixth embodiment of the present invention.

As shown in FIG. 12, the high pressure condenser in accordance with the sixth embodiment further comprises a high frequency absorber 150 covering the insulating filler 120. Other parts of the high pressure condenser in accordance with the sixth embodiment except for the high frequency absorber 150 are substantially the same as those of the high pressure condenser in accordance with any one of the first to fourth embodiments and are denoted by the same reference numerals even though they are depicted in different drawings, and a detailed description thereof will thus be omitted because it is considered to be unnecessary.

The high frequency absorber 150 is made of ferrite, and a pair of through holes 151 and 152 for passing the central conductors 70 and 80 are formed through the high frequency absorber 150.

The external periphery of the high frequency absorber 150 has the same shape as that of the insulating case 100 so that the high frequency absorber 150 is inserted into the insulating case 100. After the insulating filler 120 is hardened, the high frequency absorber 150 is inserted into the insulating case 100.

The protrusion 118 of the insulating base 116 may be covered with the high frequency absorber 150, or may pass through the high frequency absorber 150.

Here, non-described reference numeral 153 represents a through hole formed through the high frequency absorber 150 so that the protrusion 118 passes through the high frequency absorber 150.

The dielectric ceramics 50 and 60 of the high pressure condenser in accordance with the sixth embodiment have a designated capacitance when the magnetron is operated, thereby filtering out noise passing through the high pressure condenser, and the high frequency absorber 150 absorbs high frequency waves.

Figure 13:
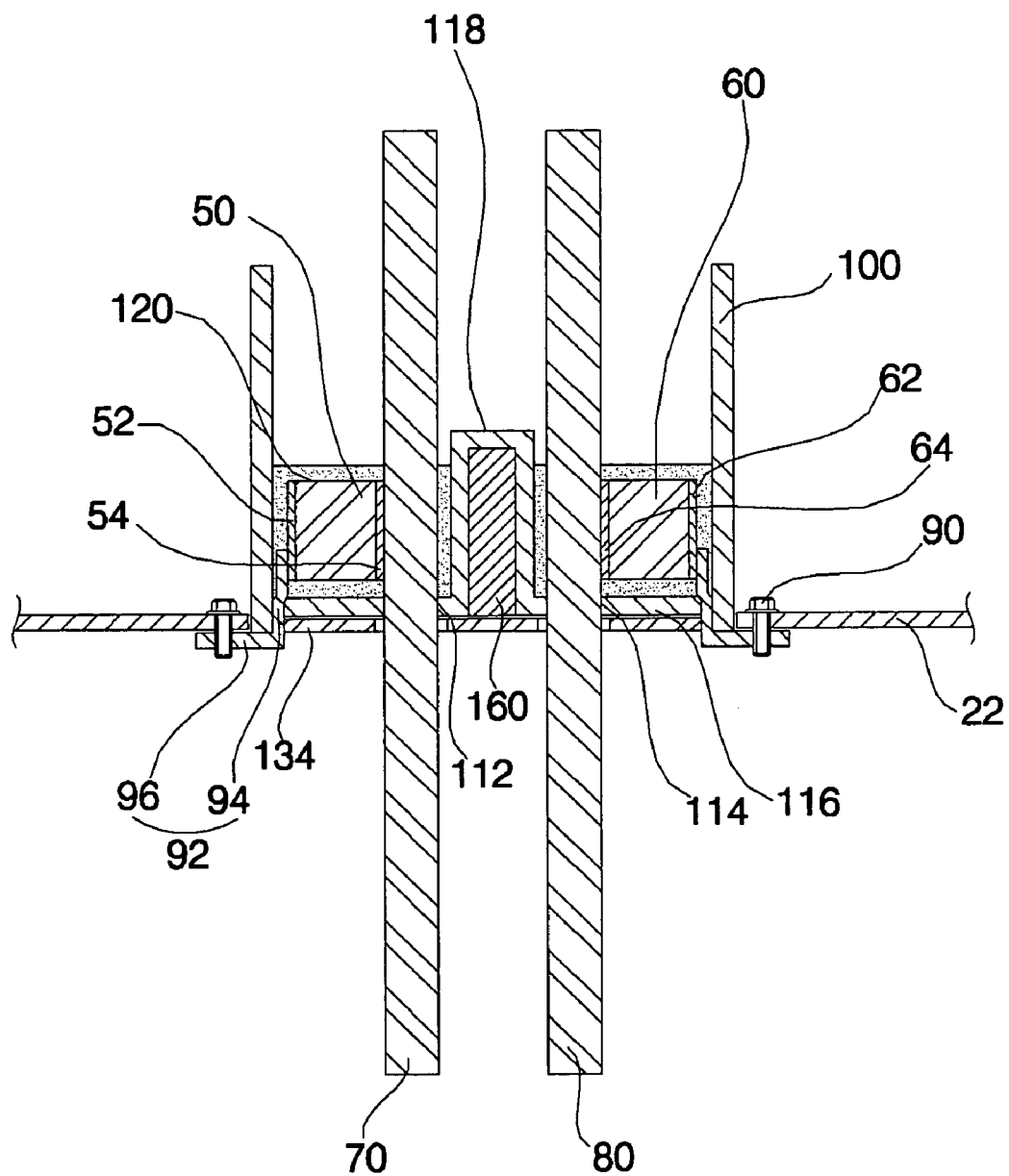
FIG. 13 is a cross-sectional view of a high pressure condenser for a magnetron in accordance with a seventh embodiment of the present invention.

FIG. 13 is a cross-sectional view of a high pressure condenser for a magnetron in accordance with a seventh embodiment of the present invention.

As shown in FIG. 13, the high pressure condenser in accordance with the seventh embodiment further comprises a high frequency absorber 160 installed inside the protrusion 118 of the insulating base 116. Other parts of the high pressure condenser in accordance with the seventh embodiment except for the high frequency absorber 160 are substantially the same as those of the high pressure condenser in accordance with any one of the first to fourth embodiments and are denoted by the same reference numerals even though they are depicted in different drawings, and a detailed description thereof will thus be omitted because it is considered to be unnecessary.

The high frequency absorber 160 is made of ferrite, has the same shape as that of the inside of the hollow protrusion 118. The high frequency absorber 160 is inserted into the protrusion 118 through the opening of the protrusion 118.

The dielectric ceramics 50 and 60 of the high pressure condenser in accordance with the seventh embodiment have a designated capacitance when the magnetron is operated, thereby filtering out noise passing through the high pressure condenser, and the high frequency absorber 160 absorbs high frequency waves having passed through the protrusion 118.

Figure 14:
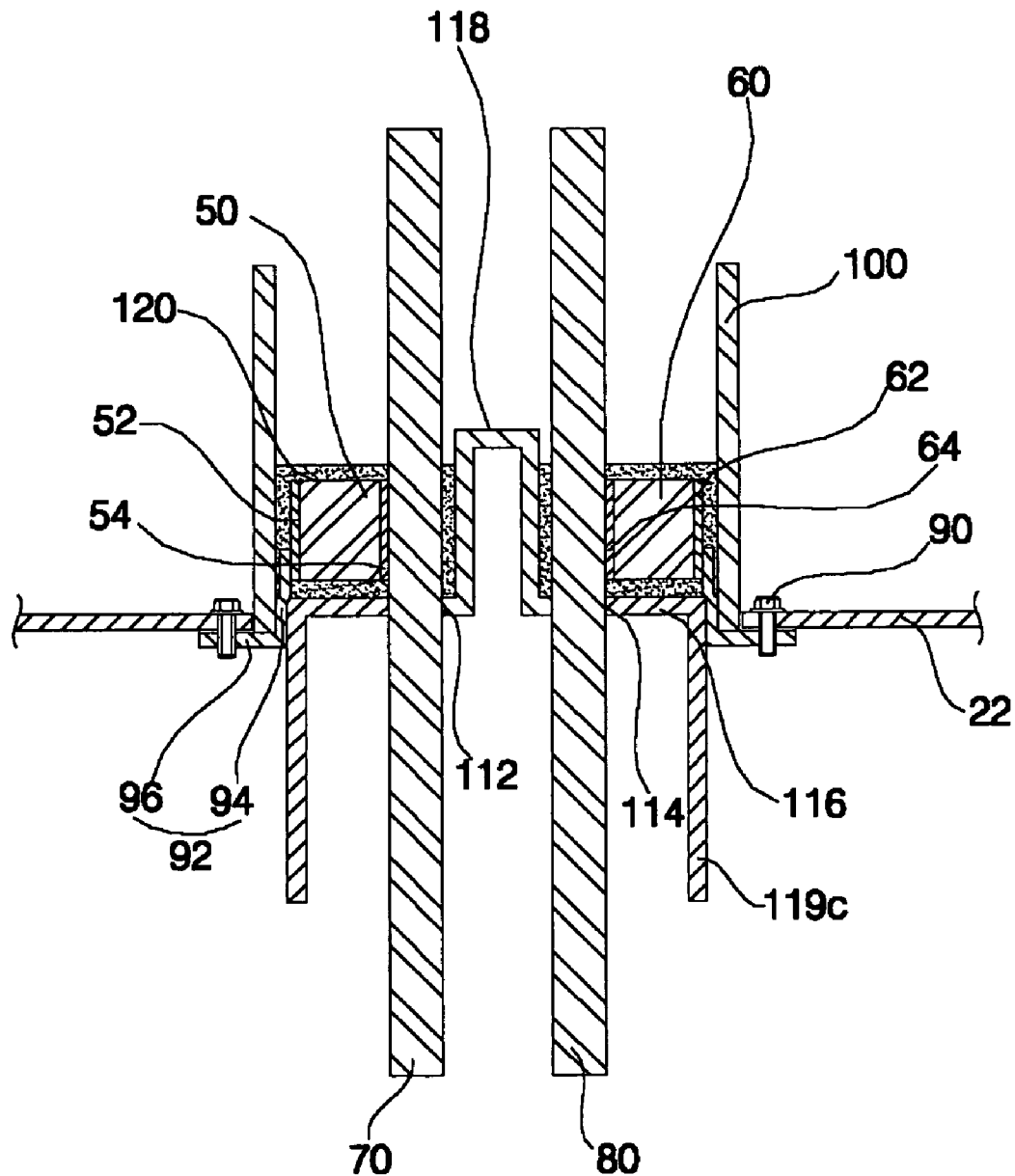
FIG. 14 is a cross-sectional view of a high pressure condenser for a magnetron in accordance with an eighth embodiment of the present invention.

FIG. 14 is a cross-sectional view of a high pressure condenser for a magnetron in accordance with an eighth embodiment of the present invention.

As shown in FIG. 14, the high pressure condenser in accordance with the eighth embodiment further comprises a tub 119c formed integrally with the insulating base 116 for protecting parts of the central conductors 70 and 80 having passed through the ground metal 92. Other parts of the high pressure condenser in accordance with the eighth embodiment except for the tub 119c are substantially the same as those of the high pressure condenser in accordance with any one of the first to fourth embodiments and are denoted by the same reference numerals even though they are depicted in different drawings, and a detailed description thereof will thus be omitted because it is considered to be unnecessary.

The tub 119c has a designated length protruded from the base 116 in the direction opposite to the protrusion 118 such that the tub 119c is disposed around parts of the peripheries of the central conductors 70 and 80 having passed through the ground metal 92.

As apparent from the above description, the present invention provides a high pressure condenser for a magnetron, in which a pair of dielectric ceramics having an arch shape are separated from each other, central conductors are connected to the internal peripheries of the dielectric ceramics, and a tub unit of a ground metal is connected to the external peripheries of the dielectric ceramics, thereby not requiring any additional structure for connecting the dielectric ceramics and the central conductors, simplifying the structures of the central conductors, and reducing the quantity of the dielectric ceramics needed in proportion to the separation interval between the dielectric ceramics.

Since an insulating base including through holes for passing the central conductors is inserted into the tub unit of the ground metal, an insulating case surrounds the dielectric ceramics and the tub unit, and an insulating filler is injected into the insulating case, it is possible to inject the insulating filer into the insulating case and to harden the insulating filler by one step, thereby reducing working costs and time.

A hollow protrusion is formed on the central portion of the insulating base between a pair of the dielectric ceramics, thereby reducing the quantity of the insulating filler needed in proportion to the dimensions of the protrusion.

An electromagnetic wave interruption gasket is installed on the ground metal, thereby minimizing the outflow of electromagnetic waves through the high pressure condenser.

The central conductors and the internal electrodes of the dielectric ceramics are joined by welding and the tub unit of the ground metal and the external electrodes of the dielectric ceramics are joined by welding, thereby rapidly and simply achieving the joint therebetween.

A pair of pipes for respectively passing the central conductors are protruded from the insulating base, thereby obtaining a sufficient insulating distance without any additional insulating tube.

A tub for protecting parts of the central conductors passing through the ground metal is formed integrally with the insulating base, thereby preventing the breakdown of the central conductors.

A high frequency absorber is installed on the ground metal or the protrusion of the insulating case or installed to cover the insulating filler, thereby minimizing the outflow of high frequency waves through the high pressure condenser.

An electromagnetic wave interruption gasket is inserted into the tub unit of the ground metal by press fit through teeth formed along the external periphery thereof, thereby being easily installed on the ground metal of the high pressure condenser.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A high pressure condenser for a magnetron, comprising:
    a pair of dielectric ceramics which are separated from each other;
    internal electrodes respectively disposed along internal peripheries of the dielectric ceramics;
    central conductors respectively connected to the internal electrodes;
    external electrodes respectively disposed along external peripheries of the dielectric ceramics;
    a ground metal that contacts the external electrodes; and
    an insulating filler that surrounds the dielectric ceramics and the central conductors.

2. The high pressure condenser as set forth in claim 1, wherein:
    the internal electrodes and the central conductors are joined to each other by welding, and
    the external electrodes and the ground metal are joined to each other by welding.

3. The high pressure condenser as set forth in claim 1, further comprising an insulating case that surrounds the insulating filler and a part of the ground metal.

4. The high pressure condenser as set forth in claim 3, wherein pipes are protruded integrally from the insulating base through which the central conductors pass.

5. The high pressure condenser as set forth in claim 3, wherein a tub unit is formed integrally with the insulating base for protecting parts of the central conductors passing through the ground metal.

6. The high pressure condenser as set forth in claim 1, further comprising an insulating base inserted into the ground metal and provided with through holes through which the central conductors pass.

7. The high pressure condenser as set forth in claim 1, further comprising a high frequency absorber installed on the ground metal for passing the central conductors.

8. The high pressure condenser as set forth in claim 1, further comprising a high frequency absorber that covers the insulating filler.

9. A high pressure condenser for a magnetron, comprising:
- a pair of dielectric ceramics which are separated from each other, and respectively including external electrodes disposed along external peripheries thereof and internal electrodes disposed along internal peripheries thereof;
- a pair of central conductors respectively connected to the internal electrodes;
- a ground metal including a tub unit that contacts the external electrodes;
- an insulating case that surrounds the dielectric ceramics and the tub unit;
- an insulating base, inserted in the tub unit, that includes a pair of through holes through which the central conductors pass and a hollow protrusion disposed between the dielectric ceramics; and
- an insulating filler that is formed by being injected into the insulating case and hardened.

10. The high pressure condenser as set forth in claim 9, wherein:
- the internal electrodes and the central conductors are joined to each other by welding; and
- the external electrodes and the tub unit are joined to each other by welding.

11. The high pressure condenser as set forth in claim 9, wherein a pair of pipes are protruded integrally from the insulating base through which the central conductors pass.

12. The high pressure condenser as set forth in claim 9, wherein a tub unit is formed integrally with the insulating base for protecting parts of the central conductors passing through the ground metal.

13. The high pressure condenser as set forth in claim 9, wherein the protrusion has a rectangular parallelepiped structure having a hollow therein and one opened surface.

14. The high pressure condenser as set forth in claim 9, further comprising a high frequency absorber installed inside the protrusion.

15. The high pressure condenser as set forth in claim 9, further comprising a high frequency absorber installed on the ground metal for passing a pair of the central conductors.

16. The high pressure condenser as set forth in claim 9, further comprising a high frequency absorber covering the insulating filler.

17. A high pressure condenser for a magnetron, comprising:
- a pair of dielectric ceramics, and respectively including external electrodes disposed along external peripheries thereof and internal electrodes disposed along internal peripheries thereof;
- a pair of central conductors respectively connected to the internal electrodes;
- a ground metal that includes a tub unit that contacts the external electrodes;
- an insulating case that surrounds the dielectric ceramics and the tub unit;
- an insulating base, inserted into the tub unit, that includes a pair of through holes through which the central conductors pass;
- an insulating filler injected into the insulating case and hardened; and
- an electromagnetic wave interruption gasket, installed on the ground metal, that includes a pair of second through holes through which the central conductors pass.

18. The high pressure condenser as set forth in claim 17, wherein:
- the internal electrodes and the central conductors are joined to each other by welding; and
- the external electrodes and the tub unit are joined to each other by welding.

19. The high pressure condenser as set forth in claim 17, wherein a pair of pipes are protruded integrally from the insulating base through which the central conductors pass.

20. The high pressure condenser as set forth in claim 17, wherein a tub unit is formed integrally with the insulating base for protecting parts of the central conductors passing through the ground metal.

21. The high pressure condenser as set forth in claim 17, further comprising a high frequency absorber installed on the ground metal for passing a pair of the central conductors.

22. The high pressure condenser as set forth in claim 17, further comprising a high frequency absorber covering the insulating filler.

23. The high pressure condenser as set forth in claim 17, wherein the pair of dielectric ceramics are separated from each other.

* * * * *